April 9, 1968
F. S. DELLA ROSE
3,377,157
METHOD OF OPERATING A BLAST FURNACE TO PRODUCE
PIG IRON AND CEMENT SLAG
Filed April 26, 1965
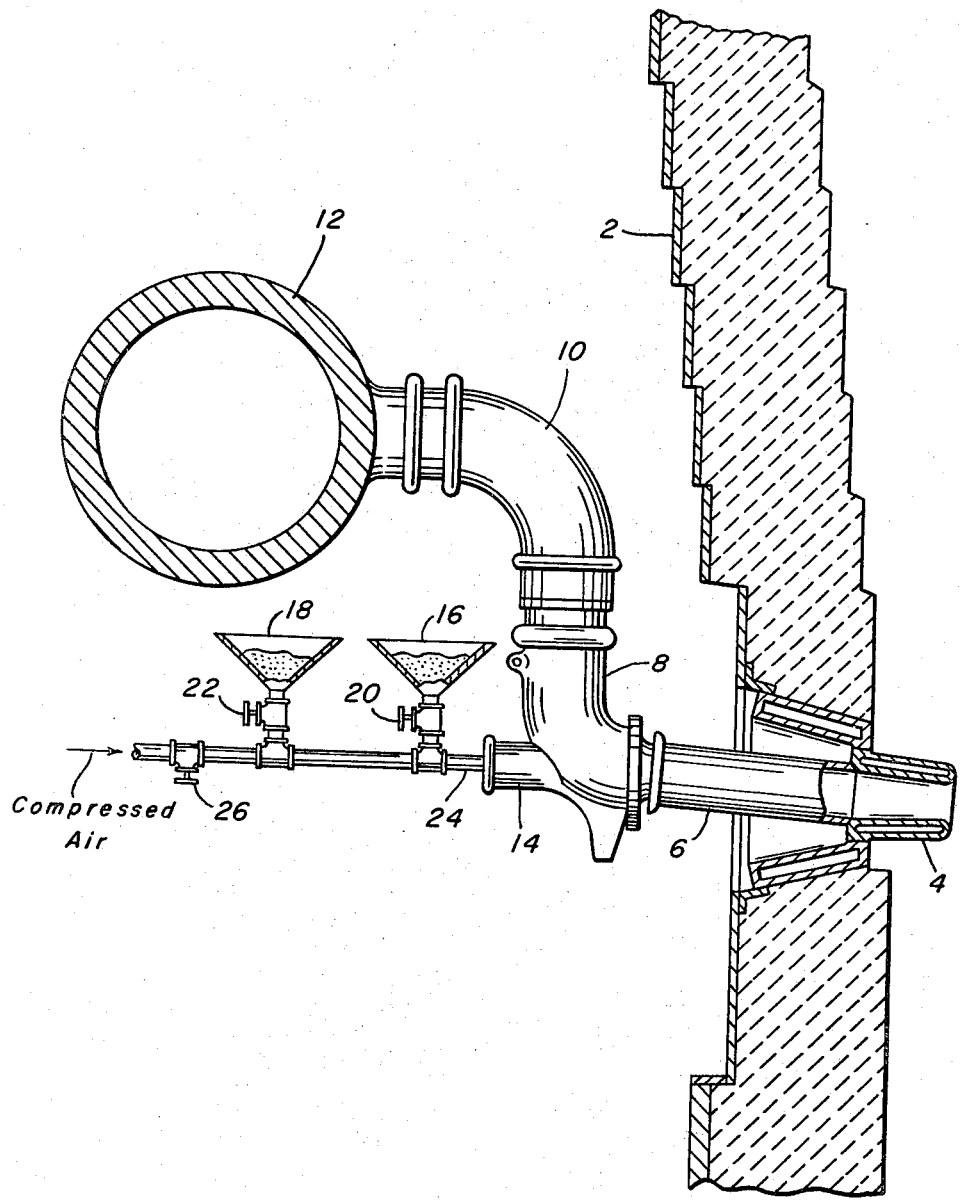
INVENTOR.
FRED S. DELLA ROSE
By Donald G. Dalton
Attorney United States Patent Office 3,377,157
Patented Apr. 9, 1968

3,377,157
METHOD OF OPERATING A BLAST FURNACE TO PRODUCE PIG IRON AND CEMENT SLAG
Fred S. Della Rose, Thornton Township, Cook County, Ill., assignor to United States Steel Corporation, a corporation of Delaware
Filed Apr. 26, 1965, Ser. No. 450,661
2 Claims. (Cl. 75—41)

ABSTRACT OF THE DISCLOSURE

A method of operating a blast furnace to produce pig iron and slag suitable for cement which includes introducing magnesia into the furnace above the slag and into the fusion zone of the slag when the slag is too viscous for best furnace operation, and introducing silica at the same location to give the desired slag composition for cement.

---

This invention relates to a method of operating a blast furnace to produce pig iron and slag suitable for use as cement. In the operation of a blast furnace for this purpose, conflict arises between the procedure necessary to produce slag suitable for cement and the procedure necessary for best operation of the blast furnace. In some instances the slag suitable for cement will not have the necessary fluidity to enable the blast furnace operator to operate the furnace efficiently.

It is therefore an object of my invention to provide a method of operating a blast furnace to produce pig iron and slag suitable for cement in which the slag produced will have the necessary fluidity for efficient operation of the furnace.

This and other objects will be more apparent after referring to the following specification and attached drawings, in which the single figure is a fragmentary view of a blast furnace.

Referring more particularly to the drawing, reference numeral 2 indicates the vertical wall of a blast furnace which is provided with the usual tuyeres 4. A blow pipe 6 leads to each tuyere with its entry end being connected to tuyere stock 8, which, in turn, is connected to a gooseneck 10, this being connected to the hot blast main 12. Tuyere stock 8 includes a peep sight portion 14. The parts so far described are conventional. According to my invention, I provide a pair of hoppers 16 and 18 connected through valves 20 and 22, respectively, to an air pipe 24 which is connected to a source of compressed air (not shown). A valve 26 controls flow of air through the pipe 24.

In the manufacture of one particular type of cement, the magnesia content of the slag must not exceed 6% and the ratio of silica to magnesia must be a minimum of three to one. The magnesia content is limited to that maximum in order to obtain the desired cement composition. While the magnesia content in the cement should be as low as possible, the magnesia must be present in the slag in order to give it sufficient fluidity for proper operation of the blast furnace. The minimum ratio of silica to magnesia is dictated by the desired slag composition suitable for cement.

In the past it has been suggested that injections be made below the tuyere level to change the composition of the slag. However, this has the disadvantage that adding the material to already formed slag results in slow chemical reactions and less uniform slag. According to my invention, I propose to add a magnesia containing substance, such as burnt dolomite, and a silica containing composition, such as sand, above the molten slag at or above the level of the tuyeres so that the additives will move upwardly with the air blast into the fusion zone of the furnace where the additives will chemically react with the burden materials to form slag of a desired uniform composition. The fusion zone is where the chemical reactions take place. This necessarily must be at and above the tuyeres since the chemical reactions cannot take place before the air is introduced at the tuyeres. When the slag becomes too viscous for proper operation of the furnace, valves 20 and 26 are opened with valve 22 being closed so that burnt dolomite from hopper 16 is blown through the tuyere stock 6 and tuyere 4 into the furnace. Since the injection is made into the hot blast, the dolomite is carried upwardly with the blast and is efficiently used in combining with the burden materials to produce a slag having the desired fluidity and yet have a chemical composition suitable for cement. If the ratio of silica to magnesia falls below the minimum ratio specified, valve 20 is closed and valve 22 is opened so that silica from the hopper 18 is fed into the furnace in place of the dolomite. Thus, by analyzing the slag composition and feeding the dolomite and silica separately and selectively, the slag obtained will have the desired composition for cement purposes while being maintained at the fluidity necessary for proper operation of the blast furnace.

While one embodiment of my invention has been shown and described it will be apparent that other adaptations and modifications may be made without departing from the scope of the following claims.

I claim:
1. The method of operating a blast furnace to produce pig iron and cement slag which comprises selectively introducing magnesia and silica into the furnace above the slag into the air blast and carrying the introduced material upward with the air blast into the fusion zone of the furnace, said magnesia being introduced when the slag is too viscous for best furnace operation and the silica is introduced in sufficient amount to obtain the proper slag composition for cement.
2. The method of operating a blast furnace according to claim 1 in which the magnesia content of the slag is maintained at a maximum of approximately six percent, and the ratio of silica to magnesia is maintained at a minimum of 3 to 1.

References Cited

UNITED STATES PATENTS

| | | | |
|---|---|---|---|
| 413,552 | 10/1889 | Pratt | 75—41 X |
| 2,057,919 | 10/1936 | Roll | 75—41 |
| 2,279,399 | 4/1942 | Hogberg et al. | 75—41 |
| 2,918,365 | 12/1959 | Kanamori et al. | 75—41 |

FOREIGN PATENTS 932,977  7/1963  Great Britain.

OTHER REFERENCES

Making, Shaping and Treating of Steel, 7th edition, United States Steel, 1957, pp. 256, 257.
Lea et al.: Chemistry of Cement and Concrete, Edward Arnold and Co., London, 1935, p. 278.

DAVID L. RECK, *Primary Examiner.*
H. W. TARRING, *Assistant Examiner.*